US 6,751,730 B1

(12) United States Patent
Walker et al.

(10) Patent No.: US 6,751,730 B1
(45) Date of Patent: Jun. 15, 2004

(54) METHOD AND APPARATUS FOR DOCUMENTING CAP REMOVAL DATA

(75) Inventors: Jay S. Walker, Ridgefield, CT (US); James A. Jorasch, Stamford, CT (US); John M. Packes, Jr., Hawthorne, NY (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/165,089

(22) Filed: Oct. 1, 1998

Related U.S. Application Data (63) Continuation-in-part of application No. 08/677,544, filed on Aug. 8, 1996, now Pat. No. 5,970,143, which is a continuation-in-part of application No. 08/628,920, filed on Apr. 8, 1996, now Pat. No. 5,828,751, which is a continuation-in-part of application No. 08/561,668, filed on Nov. 22, 1995, now Pat. No. 5,768,382.

(51) Int. Cl.[7] ................................................. H04L 9/00
(52) U.S. Cl. ....................................................... 713/161
(58) Field of Search .............................. 380/25; 713/161

(56) References Cited

U.S. PATENT DOCUMENTS

| | | | |
|---|---|---|---|
| 4,526,474 A | 7/1985 | Simon | 368/10 |
| 4,588,303 A | 5/1986 | Wirtschafter et al. | 368/10 |
| 4,616,316 A | 10/1986 | Hanpeter et al. | 364/413 |
| 4,782,966 A | 11/1988 | Thackrey | 215/230 |
| 4,899,839 A | 2/1990 | Dessertine et al. | 177/25.19 |
| 4,939,705 A | * 7/1990 | Hamilton et al. | 368/10 |
| 5,641,091 A | 6/1997 | Daneshvar | 221/3 |
| 5,678,571 A | * 10/1997 | Brown | 128/898 |
| 5,768,382 A | 6/1998 | Schneier et al. | 380/25 |
| 5,800,264 A | 9/1998 | Pascal et al. | 463/16 |
| 5,828,751 A | 10/1998 | Walker et al. | 380/25 |
| 5,850,344 A | 12/1998 | Conkright | 364/479.01 |
| 5,867,821 A | * 2/1999 | Ballanty ne et al. | 702/2 |
| 5,970,143 A | 10/1999 | Schneier et al. | 380/23 |
| 6,167,362 A | * 12/2000 | Brown | 703/11 |

FOREIGN PATENT DOCUMENTS

| | | |
|---|---|---|
| EP | 0 526 166 A2 | 7/1992 |
| WO | WO 95/09386 A1 | 6/1995 |
| WO | WO 95/26009 A1 | 9/1995 |

OTHER PUBLICATIONS

Paul Amos Robert Kubasak Drug Cards Manage Rising Prescription Costs, Personnel Journal May 1993.*
Peter Ognibene, Smart Cards Could Save Lives–and Dollars Health Care: A Computerized Personal Medial Record Would Assist Doctors and Pharmacist and Avert Dangerous errors, The Los Angeles Times Apr. 12, 1993.*
Anonymous, Patient Financial Incentives for Compliance, Feedback Suggested by Medco Exec: Expanded use of Questionnaires in Disease Management Program Planned, FDC Reports: The Pink Sheet, Sep. 19, 1994.*
Schneier, Applied Cryptography 2e, Chapter 2.*

* cited by examiner

Primary Examiner—Ayaz Sheikh
Assistant Examiner—James Seal
(74) Attorney, Agent, or Firm—Steven M. Santisi (57) ABSTRACT

A method and apparatus is disclosed that documents and authenticates cap removal data. According to a first aspect of the present invention, the apparatus measures a parameter indicative of the number of times that a cap has been removed by a user. The apparatus also encodes at least the parameter indicative of the cap removal data, thereby deriving encoded cap removal data. The apparatus outputs the encoded cap removal data to a user. According to a second aspect of the present invention, another apparatus receives the encoded cap removal data and decodes it to authenticate the cap removal data.

31 Claims, 8 Drawing Sheets

| CAP IDENTIFIER 510 | KEY 520 | USER IDENTIFIER 530 |
|---|---|---|
| 1234ABCD | 100100110110110 | USR0001 |
| 4567BCDA | 1101111011011001 | USR0002 |
| 1A2B3C4D | 0011001101010101 | USR0003 |
| 9876MNOP | 1110011100010110 | USR0004 |

METHOD AND APPARATUS FOR DOCUMENTING CAP REMOVAL DATA

CROSS-REFERENCE TO RELATED CORRESPONDING APPLICATIONS

This is a continuation-in-part of commonly owned, U.S. patent application Ser. No. 08/677,544 entitled "REMOTE AUDITING OF COMPUTER GENERATED OUTCOMES AND AUTHENTICATED BILLING AND ACCESS CONTROL SYSTEM USING CRYPTOGRAPHIC AND OTHER PROTOCOLS" filed Aug. 8, 1996, which issued as U.S. Pat. No. 5,970,143 on Oct. 19, 1999; which is a continuation-in-part of U.S. patent application Ser. No. 08/561,668 of the same title filed Nov. 22, 1995, now U.S. Pat. No. 5,768,382; and is further a continuation-in-part of commonly owned, U.S. application Ser. No. 08/628,920 entitled "METHOD AND SYSTEM FOR SECURE MEASUREMENT CERTIFICATION" filed Apr. 8, 1996, which issued as U.S. Pat. No. 5,828,751 on Oct. 27, 1998, the entirety of each incorporated by reference herein.

BACKGROUND OF THE INVENTION

1. Field of the Invention

The present invention relates generally to medicine containers. More particularly, the present invention relates to a method and apparatus for documenting and authenticating medicine container cap removal data.

2. Description of the Related Art

A major problem facing the health care industry today is the difficulty of enforcing patient compliance with prescription medications. All too often, patients ignore the directions associated with their prescriptions, consuming more or fewer pills than that recommended by their doctor. Many patients simply forget to take the medication for one or more days, resulting in a lengthened healing process. In some cases, not taking pills according to a precise schedule can result in complications requiring expensive hospital stays or increased time consulting with a physician. These cost increases from the patient's lack of compliance are passed on to health care providers and insurers.

One approach to solving the problem of patient compliance has been the development of modified pill containers which automatically dispense the correct number of pills. U.S. Pat. No. 5,641,091 to Daneshvar is a medication dispensing device which allows a patient to receive his medication on a regular basis. A series of small spaces are arranged in one or more electrically powered rotating trays to allow a proper dose via a window. While this approach makes it easier for a conscientious patient to follow his prescription, forgetful patients may simply let pills "build up" rather than consuming them. Additionally, such devices contain many moving parts that are subject to malfunction and wear. Malfunctions could result in legal liability if the patient was provided access to fewer pills than required by his prescription.

A similar dispensing device is described in U.S. Pat. No. 5,472,113 to Shaw. The automatic pill dispensing device of Shaw has cartridges rotated via an electric motor, electromagnetic clutches, a rotatable shaft, and gears. As with the Daneshvar device, there is no way for a remote third party to know whether or not the device is operating properly and whether the patient is in fact complying with his prescription.

Because third parties such as hospitals and insurance companies would like to have access to patient prescription compliance data, other devices have been created to store data such as how often a pill container has been opened or the time and date that it was opened. U.S. Pat. No. 5,016,172 to Dessertine and U.S. Pat. No. 4,939,705 to Hamilton et al. both describe such an apparatus. These devices, however, either require the user to physically deliver the apparatus to the interested third party for data retrieval and verification, or require that the device have a modem for online connection to the third party. Physical delivery is time consuming and potentially costly for the user, while an online connection requires expensive hardware and greater sophistication on the part of the user.

A need therefore exists for a method and apparatus that addresses the deficiencies of the prior art. Specifically, a need exists for a reliable and efficient method and apparatus for securely measuring, reporting and tracking pill container access data generated in an off-line environment. Accordingly, the shortcomings associated with the related art have heretofore not been adequately addressed. The present invention addresses the deficiencies of the prior art by providing an apparatus and processing approach that have not previously been proposed.

SUMMARY OF THE INVENTION

An object of the present invention is to enable a user to document the number of times that he has accessed a pill container by removing the cap, with the cap removal data secured so that a third party can authenticate that the user performed the documented number of cap removals.

An advantage of the present invention is that it enables a user to automatically produce reliably documented cap removal data. Another advantage of the present invention is that it enables a third party to rely on a measurement of the cap removal data by a user of pill containers. Yet another advantage of the present invention is that it enables a third party to provide rebates, discounts, higher reimbursement levels or rewards to a user based on a measurement of the number of cap removals performed by the user.

According to the present invention, a method and apparatus are disclosed for documenting cap removal data. The method includes the step of measuring a number of removals to determine cap removal data. The method further includes the step of encoding the determined cap removal data to derive encoded cap removal data. The method also includes the step of outputting the encoded cap removal data.

The above objects, features and advantages as well as other objects, features and advantages are readily apparent from the detailed description when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings, wherein.

DETAILED DESCRIPTION

Apparatus Architecture

Figure 1:
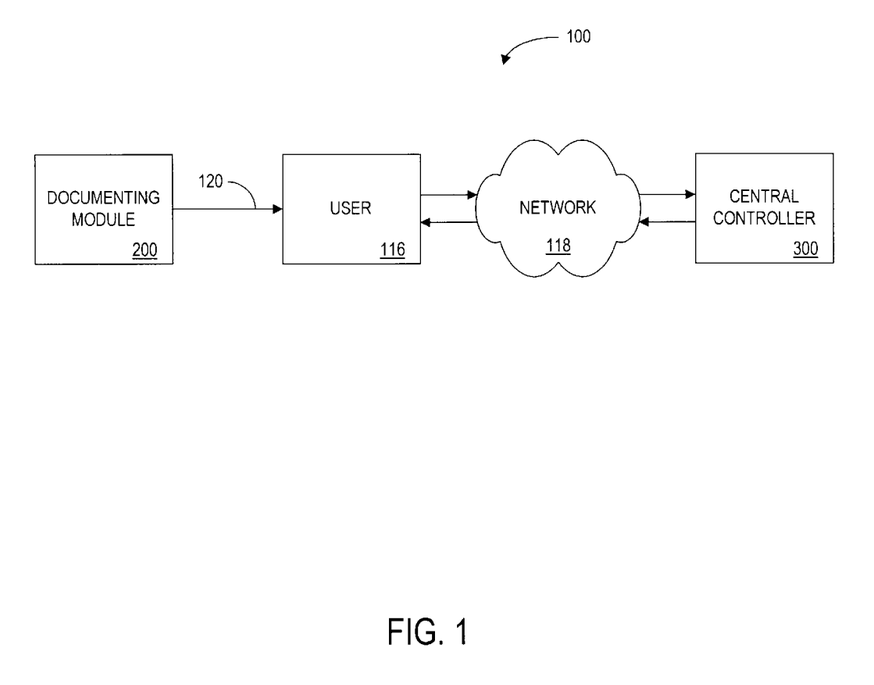
FIG. 1 is a schematic block diagram illustrating the components of a system employing one embodiment of the present invention.
Figure 2:
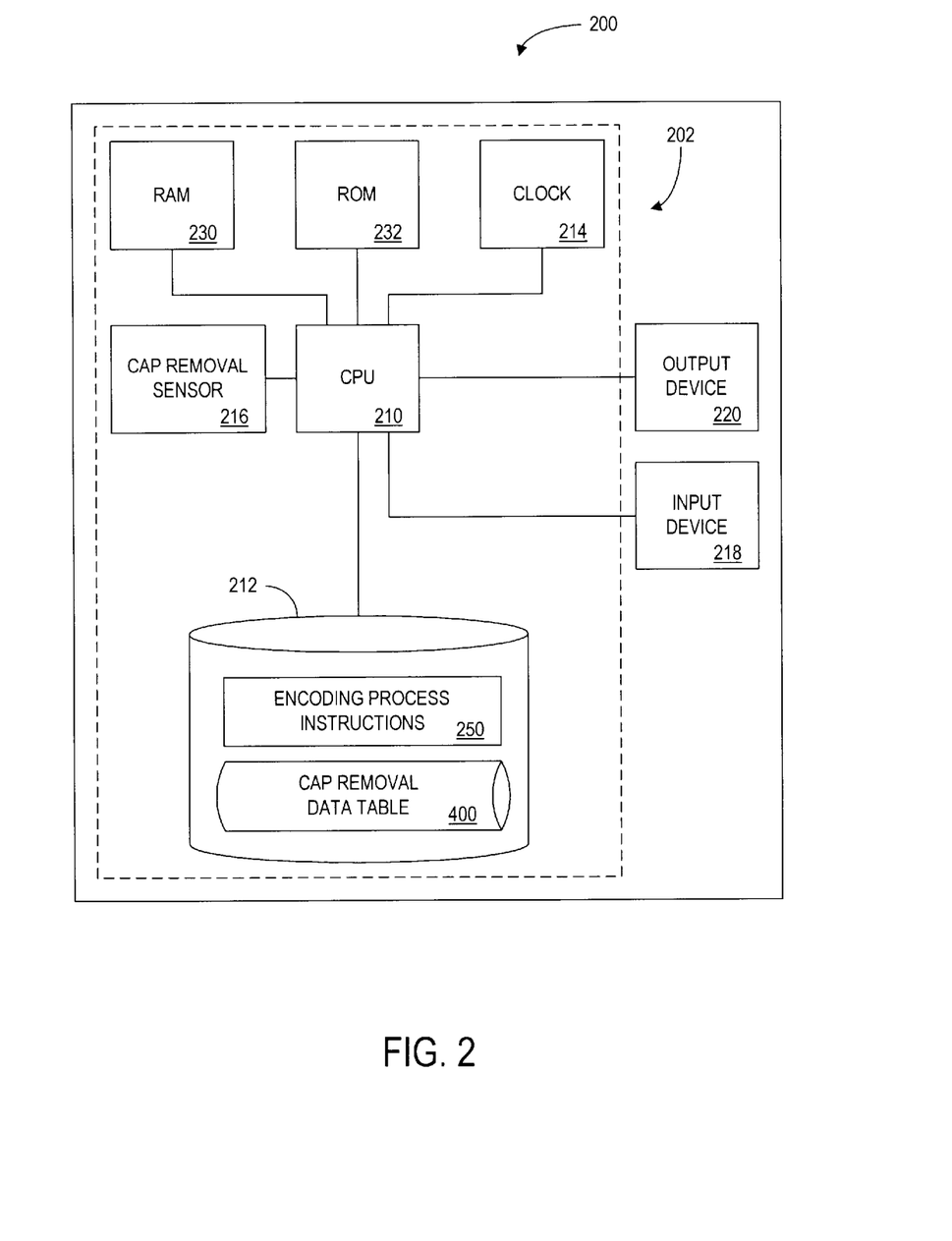
FIG. 2 is a schematic block diagram illustrating the components of the documenting module of the system of FIG. 1.
Figure 3:
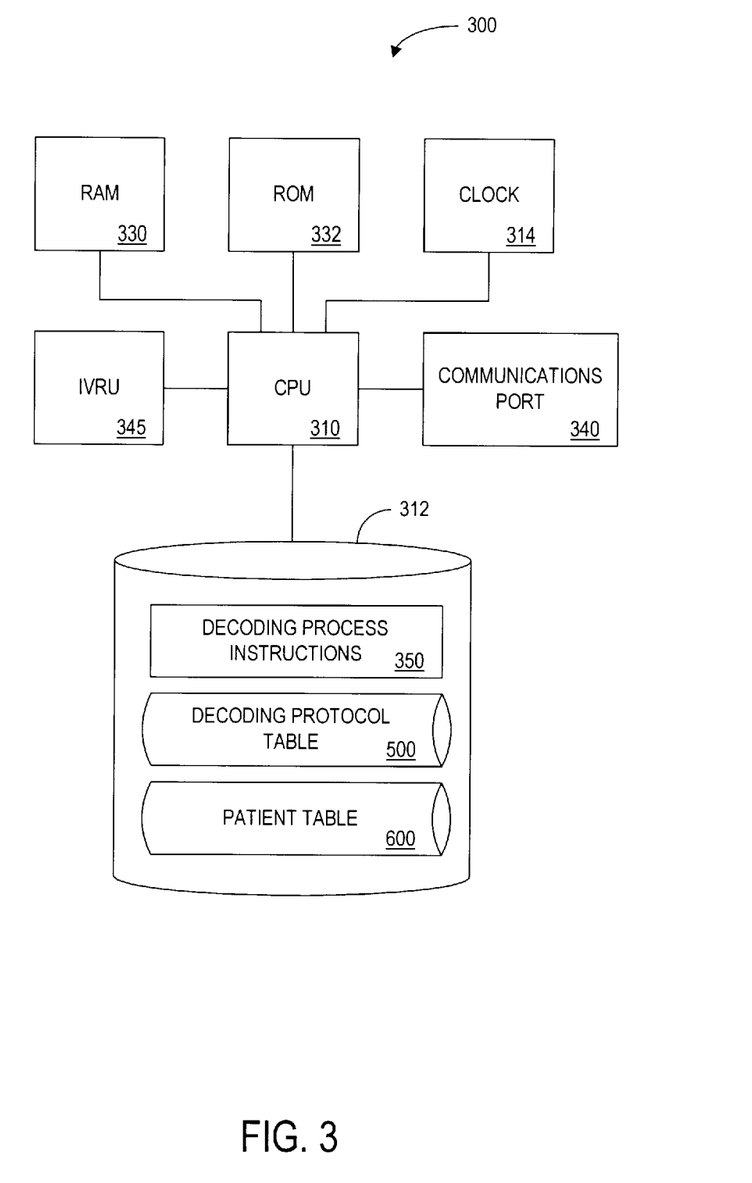
FIG. 3 is a schematic block diagram illustrating the components of the central controller of the system of FIG. 1.

An embodiment of the apparatus of the present invention will now be discussed with reference to FIGS. 1–3. FIG. 1 illustrates one exemplary system employing a documenting module 200 configured to measure and encode cap removal data generated by a user 116, and report the encoded data to user 116. The system further employs central controller 300 to receive the encoded cap removal data from user 116 via network 118. In one embodiment, network 118 is the public switched telephone network allowing the user 116 to communicate with central controller 300 via a standard telephone. Other suitable networks include local area networks ("LANs"), wide area networks ("WANs"), Intranets, the Internet, and the like. Such communication networks could also be wireless, allowing for cellular, infrared, or radio frequency ("RF") communications. FIG. 2 provides a more detailed illustration of documenting module 200 shown in FIG. 1. FIG. 3 provides a more detailed illustration of central controller 300 depicted in FIG. 1.

In a preferred embodiment, documenting module 200 includes elements incorporated within the cap of a prescription medication container, although it could also take the form of an add-on module attached to either the medicine bottle cap or bottle. Documenting module 200 could also be used in conjunction with a pill dispensing device that operated to vend pills. A wall-based system that was capable of holding a plurality of prescriptions could also incorporate the documenting technologies of the present invention.

In operation, a user employs documenting module 200 to measure and document the number of times that an openable or reclosable cap, lid, or other similar dispensing covering has been removed from the associated pill container. The container is equipped with a detector which generates a first electrical signal in response to the opening of the dispensing covering and alternatively a second electrical signal in response to the reclosing.

In accessing the pill container by removing or replacing the cap, user 116 causes cap removal data to be generated which is stored as a numeric value. This cap removal data may be the total number of times that the cap has been removed in a given time period, the number of days in which the cap was removed more than once, the number of days in which the cap was not removed, the average number of removals per day, etc. It should be noted that the same measures may apply equally to cap replacement data which is similar to cap removal data in that both indicate the number of times that the container was accessed. In addition to recording the quantity of removals, documenting module 200 may store chronographic data regarding the timing of the removals. Such chronographic data may include the date/time of each removal, the average time of day of all removals over a particular period, the average number of hours between each removal, etc. Documenting module 200 receives the cap removal data from cap removal sensor 216, and encodes the data, thereby generating encoded cap removal data. In the simplest embodiment, the encoded cap removal data is an encoded version of the cap removal data, but in preferred embodiments, it may additionally incorporate a user identifier, drug identifying data, a cap identifier, an insurance policy identifier or other pertinent information such as biometric data or a timestamp.

The encoded cap removal data is displayed to user 116, as illustrated by reference numeral 120. This encoded data may take the form of a series of numeric digits or alphanumeric characters/digits. For example, the user may view a ten digit number representing the encoded data and type these digits into the keypad of his phone while connected to the central controller 300 via an interactive voice response unit ("IVRU"). The user might alternatively read out the digits of the encoded cap removal data to a human operator.

Central controller 300 decodes the received encoded cap removal data and stores the decoded information. A third party may employ central controller 300 to determine and authenticate the number of times the user 116 removed the cap, thereby providing greater assurance that the user has consumed the prescribed medication. Such compliance data could be used to lower insurance premiums in much the same way that motorists are rewarded with lower car insurance premiums for wearing safety belts.

Referring now to FIG. 2, the components of documenting module 200 are illustrated. Documenting module 200 includes a central processing unit ("CPU") 210, such as a Pentium Processor manufactured by INTEL or the like. CPU 210 receives input from a number of sources including clock 214, cap removal sensor 216, random access memory ("RAM") 230, read only memory ("ROM") 232, input device 218, output device 220, and data storage device 212. Clock 214 maintains an internal representation of the time/date and may be used to provide a timestamp that may augment the cap removal data. Clock 214 may be used to track time of day, date, day of week or any other well known chronographic measurement.

Cap removal sensor 216 supplies CPU 210 with an indication of the number of times that the cap has been removed and/or replaced. This sensor could take many forms. In one embodiment, a switch is used which is physically engaged when the top is placed on the pill container and which is disengaged when removed. Other functionally equivalent magnet switches or the like could be used so long as they give an accurate indication of a parameter representing the opening and closing of the pill container. The cap removal parameter generated by cap removal sensor 216 may represent one of a number of measurements. The cap removal data may include, for example, the number of cap removals in a particular period, the date and time of each of the last twenty removals, the number of pills dispensed over a given period of time, etc. For examples of cap removal sensors, those of ordinary skill in the art may refer to U.S. Pat. No. 4,939,705 to Hamilton, et al., the entirety of which is incorporated by reference herein.

Another pill dispensing sensor technology that may be used in the present invention is described in U.S. Pat. No. 4,616,316 to Hanpeter et al., also incorporated by reference herein. The device of Hanpeter consists of a blister pack with an array of plastic blisters which define compartments for medication. The backing sheet has conductive traces which are respectively ruptured when the medication doses are removed. An electronic memory circuit detects the ruptures and stores the data over a period of time, performing a function similar to the cap removal sensor 216 of the present invention. Those of ordinary skill in the art will appreciate that any pill access sensing technology which is capable of generating an electronic signal may be used as cap removal sensor 216.

Input device 218 may be employed by CPU 210 to receive external input such as a user identifier, a cap identifier, an insurance policy identifier, or a prescription identifier. A number of alternative devices may be employed to perform the function of input device 218. Input device 218 may be a numeric keypad for receiving input from a user. Alternatively, a biometric device, such as a fingerprint or retinal scanner could be employed as input device 218. Further, input device 218 could be a magnetic card reader or smart card reader for receiving data from a card carried by a user. If input device 218 is a smart card reader, it may also operate as an output device to transmit an encoded measurement value to an associated smart card. Input device 218 might also incorporate speech recognition software so as to allow users to enter their user identifier via voice. Those of ordinary skill in the art will appreciate that many forms of input may be used.

CPU 210 is also configured to output data via output device 220. Output device 220 is preferably a liquid crystal display ("LCD") unit, light emitting diode ("LED") or other conventional display unit that may be used to visually communicate information to user 116. This data may be represented as numeric or alphanumeric characters, or could take the form of a barcode or pulsed light display. Numeric characters could scroll slowly across a screen of output device 220 allowing for a large number of characters to be displayed with a relatively small viewing area. Output device 220 could include one or more speakers to facilitate audible transmission to the user, allowing the user to simply hold up a telephone to the output device after a connection was made to central controller 300 for DTMF transmission of the encoded cap removal data. In another embodiment, output device 220 includes a printer or memory device for permanently recording output. Output device 220 could also incorporate standard contacts for communication with smart card devices.

CPU 210 is also connected to RAM 230 and ROM 232 for temporary and long-term storage requirements, respectively. ROM 232 could store cryptographic keys used to encode cap removal data, as well as a cap identifier which uniquely identifies the cap. Such a cap identifier may be encoded along with cap removal data before it is displayed to user 116, allowing central controller 300 to authenticate the source of the cap removal data.

CPU 210 is further configured to access data storage device 212. Data storage device 212 stores cap removal data table 400 which is described more fully with reference to FIG. 4. Storage device 212 also includes instructions for implementing the documenting steps of the present invention as described with reference to FIG. 7. Included within storage device 212 are encoding process instructions 250 which are the protocols used in encoding cap removal data. These instructions are executed by CPU 210, although a separate encoding processor could be employed in conjunction with CPU 210. Storage device 212 may store one or more cryptographic keys used in this encoding process, with a corresponding cryptographic key stored within data storage device 312 of central controller 300. Storage device 212 is preferably flash RAM, although it could also be a combination of RAM and ROM, optical disk drive, RAM drive or any other conventional storage device as would be deemed appropriate by one of ordinary skill in the art. Flash RAM has the advantage of consuming a small amount of space and being capable of storing data even when power is interrupted.

Data storage device 212 may also store prescription data such as the number of doses contained in that particular pill container or the desired time windows within which the drugs are to be consumed. This data could also be stored in RAM 230 or ROM 232.

Data storage device 212 is also preferably capable of being updated periodically as new prescriptions are obtained. User 116 may thus obtain a documenting module 200 which can be attached to pill containers that are discarded after use. Each time the user goes back to the pharmacy he is provided with a new pill container and new pills. The user brings documenting module 200 so that data and software stored in storage device 212 may be updated. In this way, revised prescription data may be conveniently entered.

In order to physically secure documenting module 200, secure perimeter 202 may be employed to protect the elements responsible for generating the encoded cap removal data. Such a secure perimeter could provide tamper detection signals to CPU 210 for use with encoding process instructions 250, as discussed more fully with reference to FIG. 6. In one embodiment, secure perimeter 202 is a resin or similar substance applied to the indicated elements which is allowed to harden to form a protective shell. Any attempt to remove one or more chips from within the resin results in destruction of the chip or the loss of data.

Power requirements of documenting module 200 could be supplied through batteries, AC/DC adapter, or solar cells. A lithium battery (not shown) could supply small voltages to the components of documenting module 200. AC/DC adapters may be used for those embodiments in which substantial power is needed for display or other purposes.

Referring now to FIG. 3, the components of central controller 300 include CPU 310, clock 314, RAM 330, ROM 332, communication port 340, Interactive Voice Response Unit ("IVRU") 345 and data storage device 312. Clock 314 is operatively connected to CPU 310 for maintaining and providing a chronographic measurement, such as time and date. Such measurements may be useful in establishing an audit trail for documenting the communications received from user 116. Communication port 340 is operatively connected to CPU 310 for transmitting and receiving data over network 118. In the preferred embodiment, communications from user 116 may be received through IVRU 345 so that a simple phone call can be used for quick and efficient transmission of encoded cap removal data. Such an embodiment allows the user to transmit data without having a modem or direct connection, allowing for off-line transmissions. In another embodiment, communication port 340 may interface CPU 310 to an I/O device controllable by a human operator or a smart card reader, allowing user 116 to download cap removal data onto a smart card which is then presented to a third party (such as a local pharmacist) with direct communication links to central controller 300.

Data storage device 312 is operatively connected to CPU 310 providing storage for and access to process instructions and data. Data storage device 312 stores decoding protocol table 500 and patient table 600, described more fully with reference to FIGS. 5 and 6, respectively. Storage device 312 further includes decoding process instructions 350, for implementing the steps of the present invention as described below with reference to FIG. 8. Storage device 312 could take the form of a conventional disk drive employing magnetic media, a CD or DVD drive, optical disk drive, RAM drive or any other conventional storage device as would be deemed appropriate by one of ordinary skill in the art.

CPU 310 is operatively connected to RAM 330 and ROM 332 for temporary and permanent storage requirements, respectively. ROM 332 could store cryptographic keys used to decode cap removal data.

Data Tables

Figure 4:
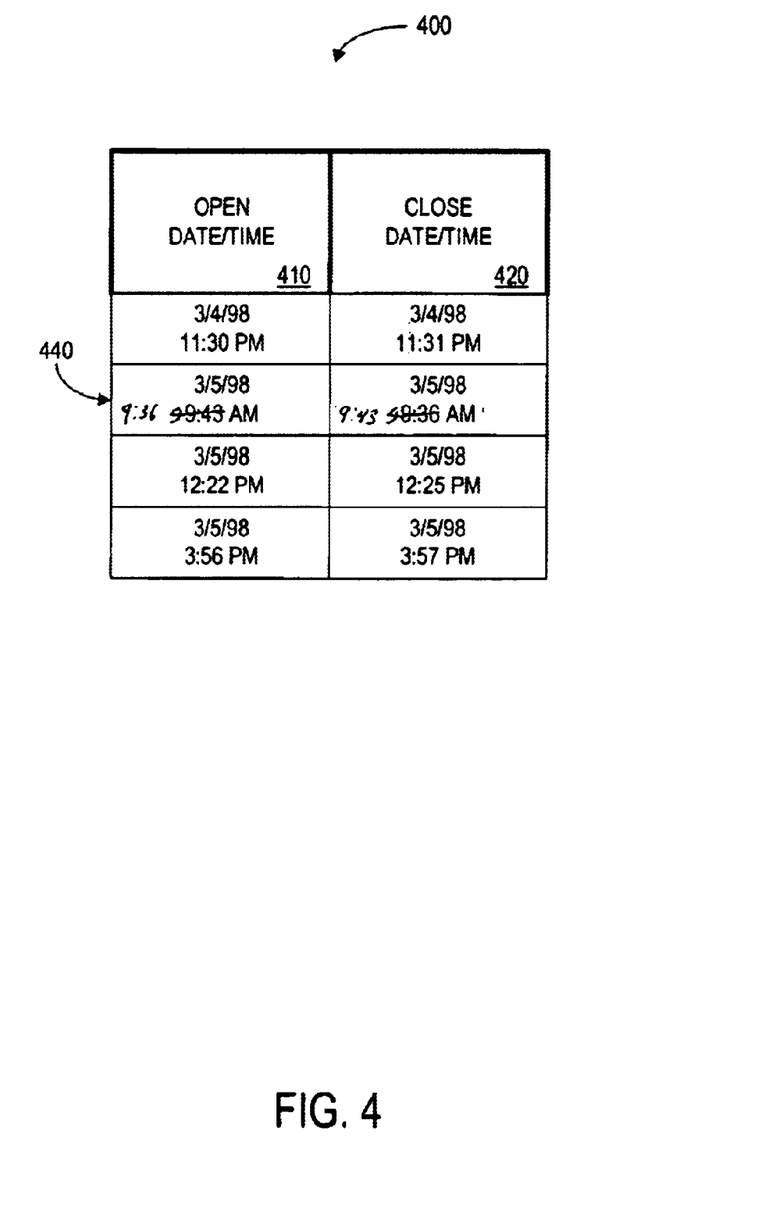
FIG. 4 depicts an exemplary cap removal data table stored in the memory of the documenting module.
Figure 5:
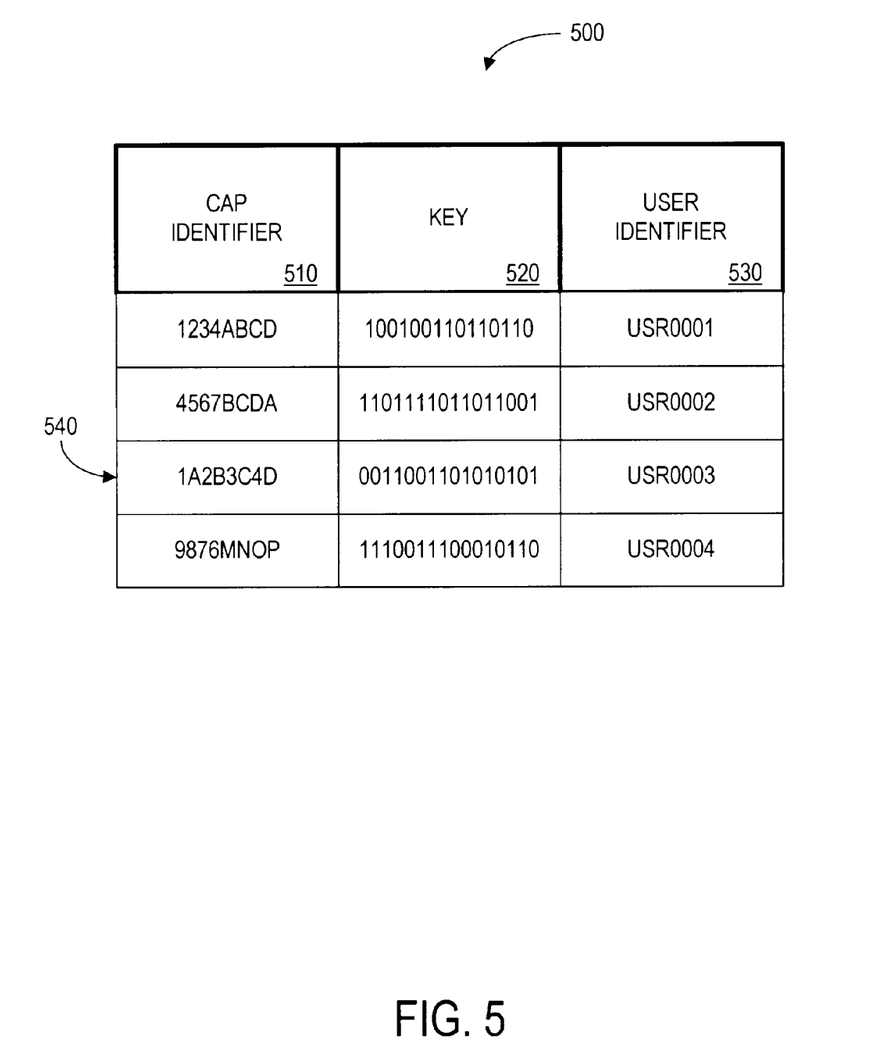
FIG. 5 depicts an exemplary decoding protocol table stored in the memory of the central controller of FIG. 3.
Figure 6:
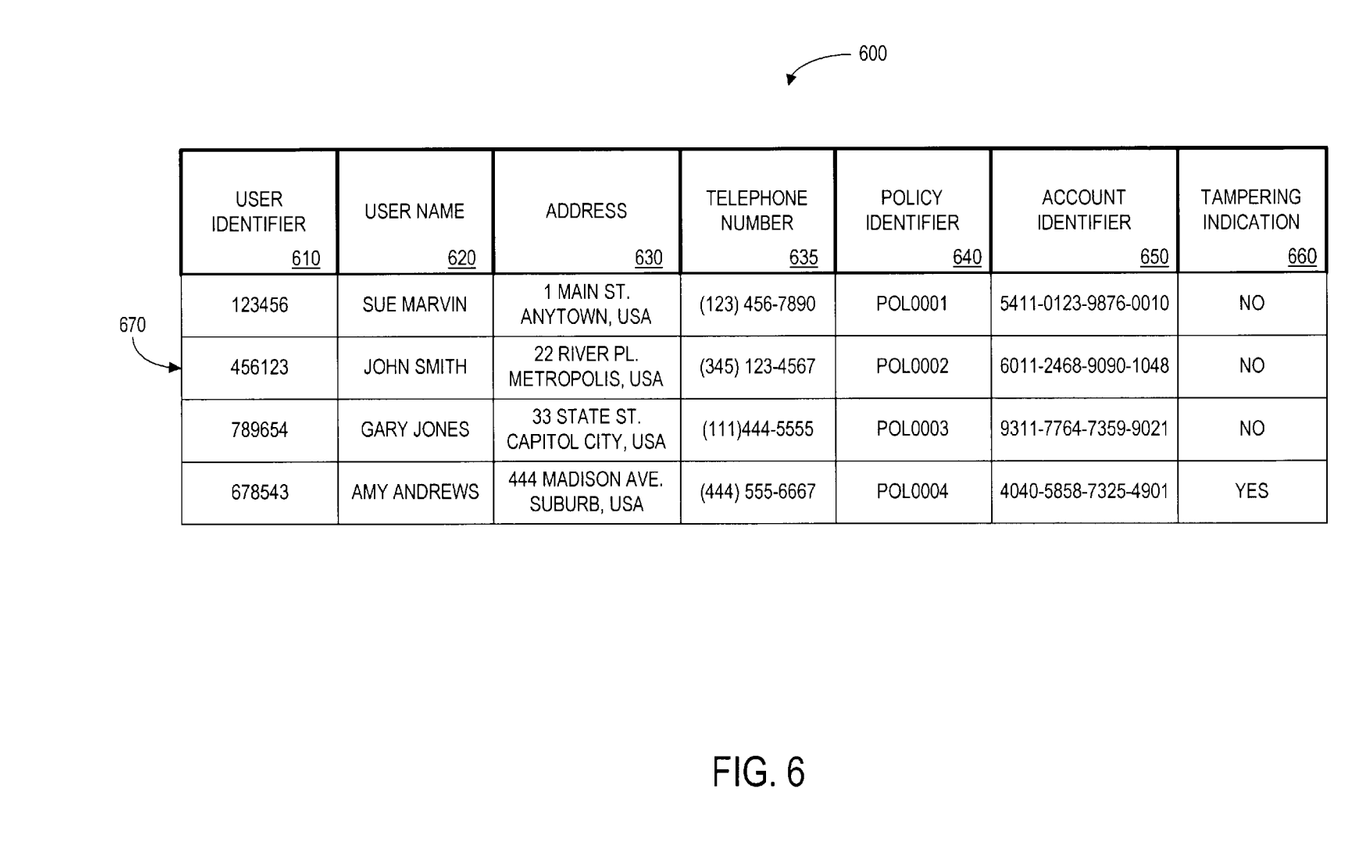
FIG. 6 depicts an exemplary user table stored in the memory of the central controller of FIG. 3.

Referring now to FIGS. 4 through 6, the data tables associated with an exemplary embodiment of the present invention will be described. According to one exemplary embodiment, a health insurance provider employs the present invention to reward policy holders with lower premiums in the event that they comply with the instructions of the prescriptions provided to them.

FIG. 4 illustrates the contents, in tabular format, of an exemplary cap removal table 400 of documenting module 200. Cap removal table 400 provides a log detailing the usage of a particular prescription, storing data generated by cap removal sensor 216. Each record of cap removal table 400 corresponds to a particular cap removal event, and includes an open date/time 410 and a close date/time 420. Open date/time 410 and close date/time 420 represent the beginning and ending times of the corresponding cap removal, respectively. Other types of chronographic data may be stored as described above. The number of records in cap removal table 400 indicates the number of times that the cap has been removed from the pill container. Records of the table may be aggregated to form weekly or monthly totals.

The exemplary cap removal table 400 includes four records. Record 440 represents a cap removal event which occurred on Mar. 5, 1998, with the cap opened at 9:36 AM and replaced at 9:43 AM. The cap removal data is stored in field 410 when the cap is removed (opened) and is stored in field 420 when the cap is replaced (closed). One of the advantages to storing the times of access is that some medications are much more effective at certain hours of the day, making documented cap removal data much more valuable to a third party. Data stored with data table 400 may be periodically deleted by CPU 210 if storage space is constrained.

Referring now to FIG. 5, there is illustrated an exemplary decoding protocol table 500 of central controller 300. Each record of decoding protocol table 500 stores data associated with a particular documenting module 200. The contents of cap identifier field 510 uniquely identify each record of table 500. Key field 520 stores one or more keys used by that particular documenting module 200 to encode/decode cap removal data. Although key field 520 shows a plurality of keys, those of ordinary skill in the art will appreciate that a single universal key could be used for each documenting module 200. In such an embodiment, the universal key might be stored in ROM 332. User identifier field 530 represents the user assigned to that particular cap identifier. Such data could be registered by the user via communications port 340 or could be received from the pharmacy which filled the prescription. The user identifier could also be assigned by central controller 300.

Record 540 of decoding protocol table 500 represents a particular cap with an identifier of "1A2B3C4D." This cap has an associated key 520 of "0011001101010101" which corresponds to user "USR0003."

Referring now to FIG. 6, there is illustrated an exemplary patient table 600. Each record of patient table 600 represents data associated with particular patient. User identifier field 610 stores data representing the purchaser or user of the pill container. Those of ordinary skill in the art will appreciate that the user identifier could be the user's name, social security number, policy number, password, PIN, etc. User name field 620 stores his or her name. Address field 630 stores the street address of the user, while phone number field 635 identifies a contact phone number for the user, allowing central controller 300 to call the user to request encoded cap removal data. Policy identifier field 640 is used in those embodiments in which discounts may be applied to a user's policy. Account identifier field 650 identifies a financial account such as a credit card number or checking account number. This account could be used to reward or penalize the user 116 based on the received cap removal data.

In one embodiment, user compliance may be authenticated through the decoding of the received encoded cap removal data. The user may be rewarded with a discounted monthly insurance premium to reflect the lower expected probability of future complications. Other rewards could include a fixed discount off of future prescriptions, or a decrease in the amount of the deductible for hospital visits associated with the condition for which the drugs were prescribed.

Tampering indication field 660 stores an indication of whether or not secure perimeter 202 has been breached. This tampering indication is generated by CPU 210 and transmitted to central controller 300 via encoded cap removal data.

The exemplary patient table 600 includes four records. Record 670 stores information about the user "JOHN SMITH" whose user identifier is "456123." Address field 630 indicates that he lives at "22 RIVER PL. METROPOLIS, USA" and that his phone number is "(345) 123-4567." He has an insurance policy identified as "POL0002" and has an account identifier of "6011-2468-9090-1048" for use in those embodiment requiring billing or the provision of rewards. Field 660 stores an indication that there has been "NO" tampering detected.

Apparatus Operation

Having thus described the architecture and components of the present invention, the operation of documenting module 200 and central controller 300 will now be described in greater detail with reference to FIGS. 7 and 8, and continuing reference to FIGS. 1–6.

Figure 7:
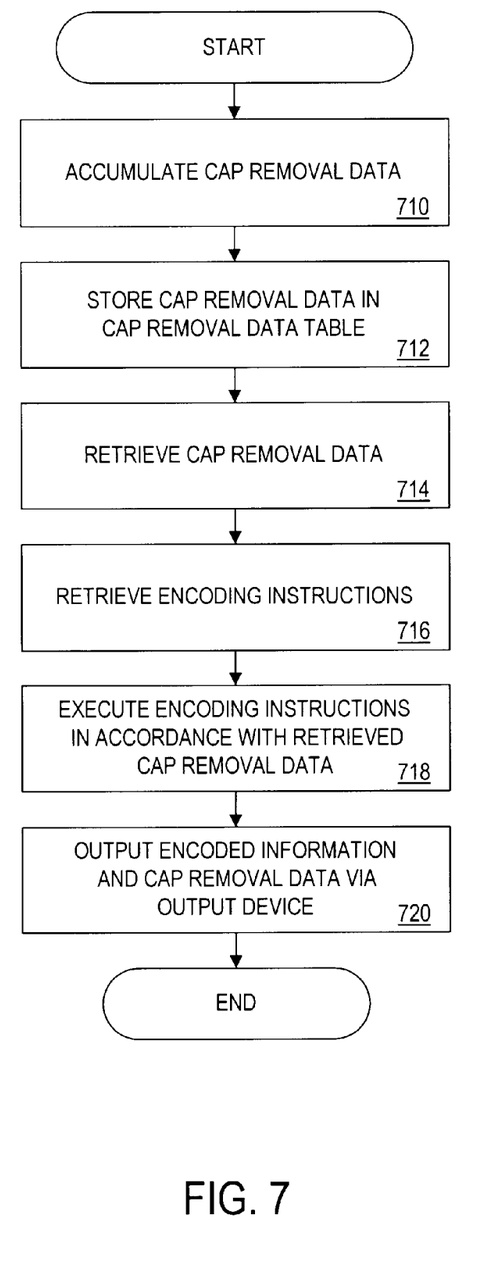
FIG. 7 is a flowchart illustrating the computer-implemented process steps enabling a user to document cap removal data.

Referring now to FIG. 7, a flowchart is presented illustrating the process steps implemented by CPU 210 of documenting module 200. At step 710, CPU 210 accumulates data indicating that the cap has been removed by receiving signals from sensor 216, a switch which is physically engaged when the top is removed or replaced. Sensor 216 could generate data for both removals and replacements, or it could be limited to sensing only removals or only replacements. At step 712, this data is stored in cap removal data table 400. In a preferred embodiment, data regarding every cap removal is stored, although data could of course be selectively stored if memory limitations were a constraint. For example, every fifth cap removal could be stored or every cap removal occurring between the hours of 2:00 PM and 6:00 PM. In another embodiment, cap removal data represents only an indication of whether or not the cap has been removed within the parameters described by the prescription. Thus, data storage device 212 of documenting module 200 stores a positive value if the patient has removed the cap once every day between the hours of 3:00 PM and 9:00 PM, and stores a negative value if one or more days have elapsed in which the cap was not removed within this window. Sensor 216 could also transmit cap removal data to CPU 210 only a fixed number of times within a given period. For example, the maximum number of transmitted cap removals within a twenty-four hour period might be two. Such a restriction would make it impossible for a user to generate false cap removal data by repeatedly opening and closing the cap within a short period of time. A user with a month long prescription, for example, might realize at the end of the month that he had forgotten to take his medication. Trying to generate a month's worth of cap removal data would be futile since only two cap removal events would be recorded within each twenty four hour period. Although described as being stored in cap removal data table 400, those of ordinary skill in the art will appreciate that cap removal data could alternatively be stored in RAM 230 or some other type of chip based memory within documenting module 200.

At step 714, this stored data representing a measurement of the number of cap removals is retrieved by CPU 210. In one embodiment, CPU 210 retrieves the number of records within cap removal data table 400 in order to determine the number of times that the cap has been removed. For many prescriptions, this will be a number ranging from ten to a hundred, depending on the period of time covered. CPU 210 next retrieves encoding process instructions 250 from data storage device 212 at step 716. These instructions are executed at step 718 and applied to the cap removal data retrieved at step 714. For example, if the number of cap removals is "36" the resulting encoded cap removal data may be "3489112073." The advantage of encoding the cap removal data is that the user is not able to lie about the number of cap removals when presenting the data to a third party. Without knowing the encoding protocols, the user does not know the encoded equivalent of any set of cap removal data, thus preventing the user from fabricating false cap removal data. Although the user could simply make up a number to represent false cap removal data, the probability that it represented a reasonable number of cap removals when decoded would be made vanishingly small.

The instructions of step 718 may direct CPU 210 to perform any type of encoding commonly used to render data secure. Examples include symmetric key encryption, public key encryption, hash algorithms, digital signatures, and the like. If lower levels of security are required, substitution ciphers or transposition ciphers may be appropriate. Common types of encoding are described in "Applied Cryptography, 2nd Edition" by Bruce Schneier, 1996.

Although step 718, as illustrated, represents the steps required to encode the number of times the cap has been removed, it may also include steps for encoding other data in addition to the cap removal data, including the user identifier, the cap identifier, a beginning timestamp and an ending timestamp. The user may also enter the number of pills that he takes at each cap removal event, entering the information into input device 218. In one embodiment, a cap identifier is stored in ROM 232 of documenting module 200. CPU 210 retrieves this cap identifier and concatenates it with the cap removal data retrieved at step 714. The resulting combined data is then encoded as described above. The advantage of this embodiment is that when the encoded cap removal data is decoded by central controller 300, the identity of the cap may be authenticated in addition to the number of cap removals, preventing a user from providing the encoded cap removal data from another user's documenting module 200. The encoding process of step 718 may also incorporate results from an integrity test of secure perimeter 202. Should CPU 210 detect that the secure perimeter had been breached, an indication is concatenated with the cap removal data prior to the encoding process. Decoding by central controller 300 then reveals evidence of the breach.

The retrieval of cap removal data at step 714 and the subsequent encoding at steps 716 and 718 may be scheduled to occur at prescribed dates, such as the first day of each month or the date at which the prescription is scheduled to run out. The steps may also be performed upon request by user 116. In this embodiment, the user actuates a button of input device 218 of documenting module 200, the actuation signaling CPU 210 to perform the encoding operation.

At step 720, CPU 210 outputs the encoded cap removal data. The step of outputting the encoded cap removal data may be performed in a number of ways. In a preferred embodiment, the encoded cap removal data is output via output device 220 for viewing by the user. The user may then initiate a phone call to IVRU 345 of central controller 300 and type in the displayed encoded cap removal data using the touch tone keys of his telephone. Such a process has the advantage of simplicity and low cost. No modem or online connection is required. Users may be entered into sweepstakes drawings every time that they call in with encoded cap removal data, encouraging greater participation rates. The probability of winning the sweepstakes could even be based partly on the degree to which the user complied with the prescription instructions.

Input device 218 could incorporate a switch or button, actuated by user 116 to control the display of output device 220. Such an embodiment would allow the user to select whether to view the cap removal data in encoded or non-encoded form.

In an alternate embodiment, the encoded cap removal data may be output to a smart card or magnetic stripe card via an appropriate interface (not shown). The user could insert a smart card into an electrical contact of output device 220, initiating the transfer of data to the smart card. This smart card could then be mailed to the central controller 300 for decoding, or inserted into a reader device (such as a kiosk) at a hospital or pharmacy for later transmission to central controller 300.

It should be noted that the functionality of step 720 may include outputting data in addition to the encoded cap removal data. For example, the user identifier, a beginning timestamp and an ending timestamp may be output in either an encoded or non-encoded format. As described with respect to the encoded cap removal data, the step of outputting may be accomplished via output device 220 or an appropriate smart card or magnetic stripe card interface.

Figure 8:
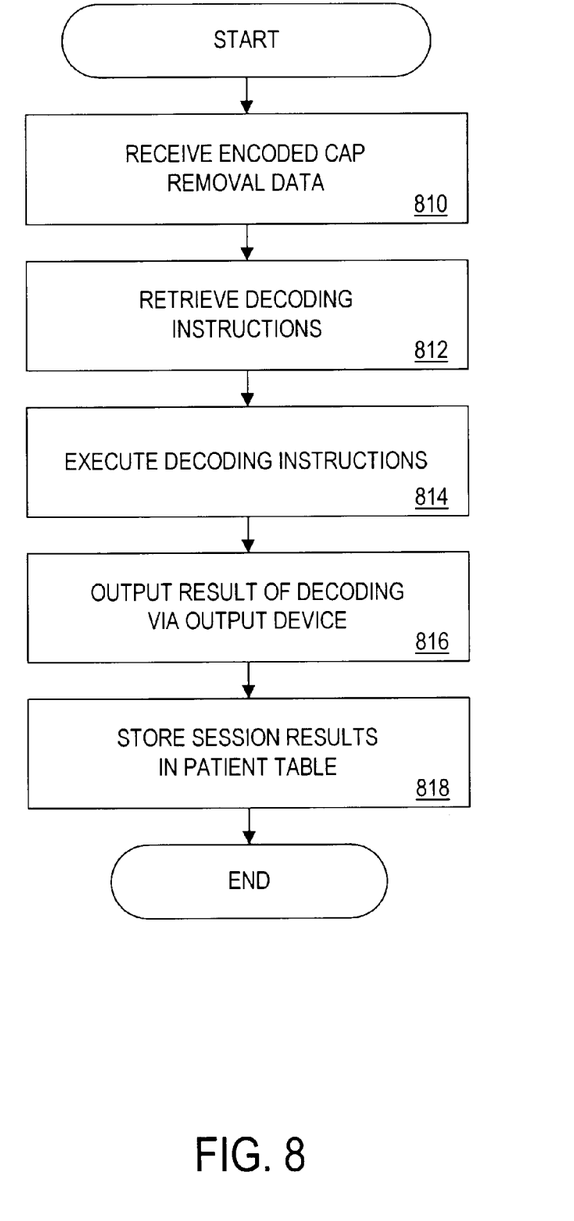
FIG. 8 is a flowchart illustrating the computer-implemented processes steps enabling a third party to authenticate cap removal data.

Referring now to FIG. 8, a flowchart is presented illustrating the computer implemented process steps of authenticating the received encoded cap removal data. At step 810, central controller 300 receives the encoded cap removal data, user identifier and cap identifier from user 116. Preferably, the encoded cap removal data is transmitted by the user via IVRU 345, however the user may alternatively employ a smart card or equivalent device which may be physically delivered to an operator of central controller 300. In the preferred embodiment, the encoded cap removal data may also include additional encoded information such as a beginning timestamp, an ending timestamp, a secure perimeter test result, or a diagnostic test result as described with reference to FIG. 7.

At step 812, central controller 300 retrieves decoding process instructions 350 from data storage device 312 and then executes these instructions at step 814 to decode the received cap removal data in order to derive a parameter indicative of the decoded cap removal data. In the preferred embodiment, additional data may be derived from the encoded cap removal data. According to the preferred embodiment, step 814 includes the steps of deriving a beginning timestamp, an ending timestamp, the secure perimeter test result or a diagnostic test result.

For those embodiments in which cap removal data is encoded by calculating a hash value associated with the cap removal data, central controller 300 executes decoding process instructions 350 to apply the same hash algorithm to the cap removal data to determine the associated hash value. If the two hash values are the same, the cap removal data has been authenticated.

At step 814, central controller 300 may additionally determine whether the secure perimeter of documenting module 200 has been breached. Although this determination may be effected in a number of conventional ways, in the present embodiment, the determination is made based on the secure perimeter test result decoded at step 814. If central controller 300 determines that the secure perimeter has been breached, central controller 300 is directed to store an indication within the tampering indication field 660 of patient database 600.

At step 816, CPU 310 outputs the result of decoding step 814 to the user, providing immediate feedback as to the documented cap removal data. This output may be in audio form, provided via IVRU 345 or communications port 340. The decoded cap removal data is then stored at step 818 in patient table 600.

CPU 310 may additionally update user data stored within data storage device 312 based on the decoded cap removal data. For example, a user record may be flagged to indicate that the patient had not complied with the instructions of his prescription, or that he had complied with only the bare minimum required. Historical user data such as this could provide the basis for rewards or penalties, and could serve as a basis for making pricing decisions for future insurance coverage. Users might be provided with higher reimbursement levels for drugs for which they had complied with the prescription instructions. For example, a user might pay $100 for a prescription, with the insurance provider reimbursing one quarter of that amount if the user does not comply with the prescription requirements, and one half of that amount if he does comply with the requirements. Insurance companies might also require that the user call in with encoded cap removal data before any reimbursements are provided.

It should also be recognized that documenting module 200 may include additional processing instructions to store cap removal statistics associated with a user, and may output an encoded cap removal code only upon reaching a predetermined reward threshold. Thus, encoding process instructions 250 could include code which outputs encoded data only when the user opens the pill container a number of times equal to the number of doses stored within the container.

A further application of the present invention enables a pharmaceutical supplier to offer rebates to purchasers of pharmaceuticals based on usage. Alternatively, a physician could provide a money back guarantee provided a user conforms with the prescription for a specified period of time.

Yet another application of the present invention enables medical service providers such as doctors, health maintenance organizations and insurance companies to offer preferred rates to their clients who consistently follow prescription instructions. By employing the present invention, any medical service provider may verify prescription compliance.

The disclosed method and apparatus for authenticating cap removal data may be applied to a number of commercial applications. For example, drug testing trials commonly involve dispensing drugs to a number of test subjects. These subjects are monitored to determine the efficacy of the drug, with the results provided to a governing authority such as the Food and Drug Administration for approval. Subjects who do not take the medication according to the prescribed schedule will of course negatively impact the results, so drug companies could use the authentication procedure of the present invention to eliminate bad data from the study.

While the best mode for carrying out the invention has been described in detail, those familiar with the art to which the invention relates will recognize various alternative designs and embodiments for practicing the invention. These alternative embodiments are within the scope of the present invention. Accordingly, the scope of the present invention embodies the scope of the claims appended hereto.

We claim:

1. A method composing:
    recording data descriptive of one or more cap removal actions by a patient;
    encrypting the data into a code that cannot be decrypted without use of a cryptographic decoding protocol;
    outputting the code to the patient to enable the patient to communicate the code to a system that is operable to decrypt the code; and
    if the data encrypted in the code indicates compliance with a description instruction, entering the patient into a sweepstakes upon the patient communicating the code to the system.

2. The method of claim 1 further including receiving a user identifier representing an identity of the patient; and wherein encrypting the data includes encrypting the user identifier.

3. The method of claim 2 wherein receiving the user identifier includes reading a magnetic stripe card.

4. The method of claim 2 wherein receiving the user identifier includes receiving input from a keypad.

5. The method of claim 1 wherein encrypting the data includes executing cryptographic protocols.

6. The method of claim 1 wherein encrypting the data includes retrieving a stored key.

7. The method of claim 1 wherein encrypting the data includes encoding a tampering indication.

8. The method of claim 1 wherein outputting the code includes transmitting a signal to a display device and displaying the code.

9. The method of claim 1 wherein outputting the code includes transmitting a signal to an audio output device and outputting the encoded cap removal data in an audible form.

10. The method of claim 1 wherein outputting the code includes transmitting a signal to a memory device and storing the code.

11. The method of claim 1 wherein outputting the code includes transmitting a signal to a smart card device.

12. The method of claim 1 further including receiving a cap identifier representing an identity of a documenting module; and wherein encrypting the data includes encoding the cap identifier.

13. The method of claim 1 further including determining a timestamp representing a time associated with an individual cap removal action; and wherein encrypting the data includes encoding the timestamp.

14. The method of claim 13 wherein the timestamp represents the time of at least one cap removal action.

15. A method comprising:
    recording data descriptive of one or more cap removal actions by a patient in a data storage device;
    encrypting the data into a code that cannot be decrypted without use of a cryptographic decoding protocol;

outputting the code to the patient to enable the patient to communicate the code to a system that is operable to decrypt the code; and if the data encrypted in the code indicates compliance with a prescription instructions, entering the patient into a sweepstakes upon the patient communicating the code to the system.

16. A method comprising:

measuring data associated with cap removals;

storing the data in a data storage device;

encoding the data such that the encoded data cannot be decoded without use of a cryptographic decoding protocol;

outputting the encoded data to the user for communication to a system operable to decode the data; and if the data encrypted in the code indicates compliance with a prescription instruction, entering the patient into a sweepstakes upon the patient communicating the code to the system.

17. An apparatus comprising:

an input device;

an output device;

a memory configured to store cap removal data; and a processor operatively coupled to the memory, input device, and output device to:

measure data associated with cap removals;

store the data in a data storage device;

encode the data such that the encoded data cannot be decoded without use of a cryptographic decoding protocol;

output the encoded data to the user for communication to a system operable to decode the data; and if the data encrypted in the code indicates compliance with a prescription instruction, enter the patient into a sweepstakes upon the patient communicating the code to the system.

18. An apparatus comprising:

means for determining data associated with cap removals;

means for recording the data;

means for encrypting the data such that the encrypted data cannot be decrypted without use of a cryptographic decoding protocol;

means for outputting the encrypted data to the user for communication to a system operable to decrypt the data; and means for entering the patient into a sweepstakes upon the patient communicating the code to the system, if the data encrypted in the code indicates compliance with a prescription instruction.

19. An apparatus comprising:

means for storing data descriptive of one or more cap removal actions by a patient;

means for encoding the data into a code that cannot be decoded without use of a cryptographic decoding protocol;

means for outputting the code to the patient to enable the patient to communicate the code to a system that is operable to decode the code; and means for entering the patient into a sweepstakes upon the patient communicating the code to the system if the data encrypted in the code indicates compliance with a prescription instruction.

20. A storage medium encoded with processing instructions for directing a processor to:

record data descriptive of one or more cap removal actions by a patient;

encrypt the data into a code that cannot be decrypted without use of a cryptographic decoding protocol;

output the code to the patient to enable the patient to communicate the code to a system that is operable to decrypt the code; and if the data encrypted in the code indicates compliance with a prescription instruction, enter the patient into a sweepstakes upon the patient communicating the code to the system.

21. A method comprising:

receiving a code from a patient, wherein the code includes encrypted data that is descriptive of one or more cap removal actions by the patient and cannot be decrypted without use of a cryptographic decoding protocol;

decrypting the code to determine the data;

if the data encrypted in the code indicates compliance with a prescription instruction, entering the patient into a sweepstakes upon the patient communicating the code to the system;

determining a discount on a potential purchase based upon the data; and outputting an offer including the discount.

22. The method of claim 1, wherein the patient is eligible to receive a prize if upon authentication, data encrypted in the code indicates compliance with the prescription instruction.

23. The method of claim 1, wherein compliance information is reported to a third-party.

24. The method of claim 23 wherein the third-party may include at least one of: a doctor; a hospital; an insurance company; a health-care entity; and a medical information database.

25. The method of claim 1, wherein a probability of winning the sweepstakes is based upon the code.

26. The method of claim 1, wherein a probability of winning the sweepstakes is based upon a degree to which the patient complied with the prescription instruction.

27. The method of claim 16, wherein the patient is eligible to receive a prize if upon authentication, data encrypted in the code indicates compliance with the prescription instruction.

28. The method of claim 16, wherein compliance information is reported to a third-party.

29. The method of claim 28 wherein the third-party may include at least one of: a doctor; a hospital; an insurance company; a health-care entity; and a medical information database.

30. The method of claim 16, wherein a probability of winning the sweepstakes is based upon the code.

31. The method of claim 16, wherein a probability of winning the sweepstakes is based upon a degree to which the patient complied with the prescription instruction.

* * * * *

UNITED STATES PATENT AND TRADEMARK OFFICE
CERTIFICATE OF CORRECTION

| | | |
|---|---|---|
| PATENT NO. | : 6,751,730 B1 | Page 1 of 1 |
| APPLICATION NO. | : 09/165089 | |
| DATED | : June 15, 2004 | |
| INVENTOR(S) | : Jay S. Walker et al. | |

It is certified that error appears in the above-identified patent and that said Letters Patent is hereby corrected as shown below:

In claim 1, line 1, column 12, REPLACE the word "composing"

with the word -- comprising--.

Signed and Sealed this

Twentieth Day of November, 2007

JON W. DUDAS
*Director of the United States Patent and Trademark Office*